United States Patent Office 3,169,274
Patented Feb. 16, 1965

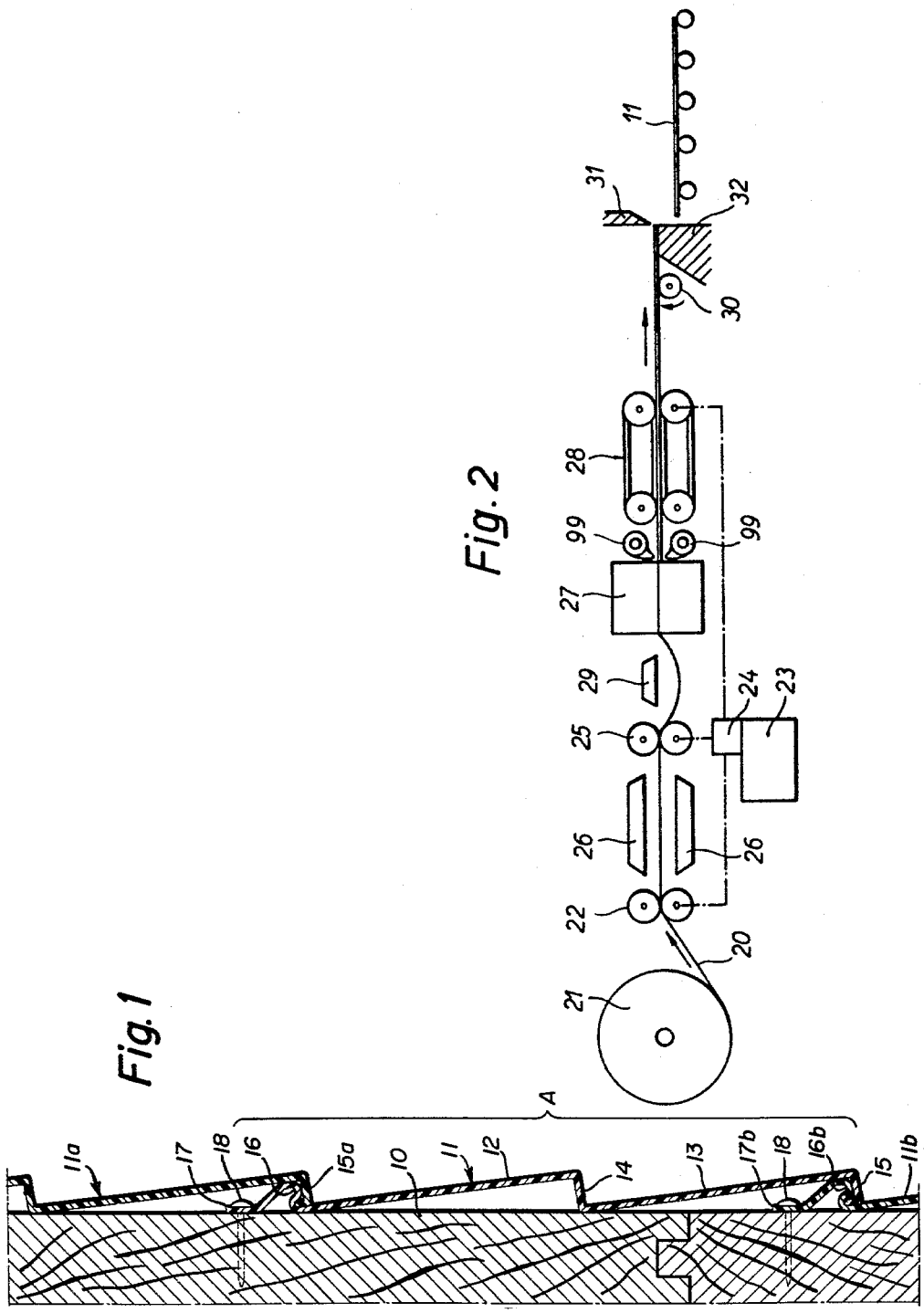

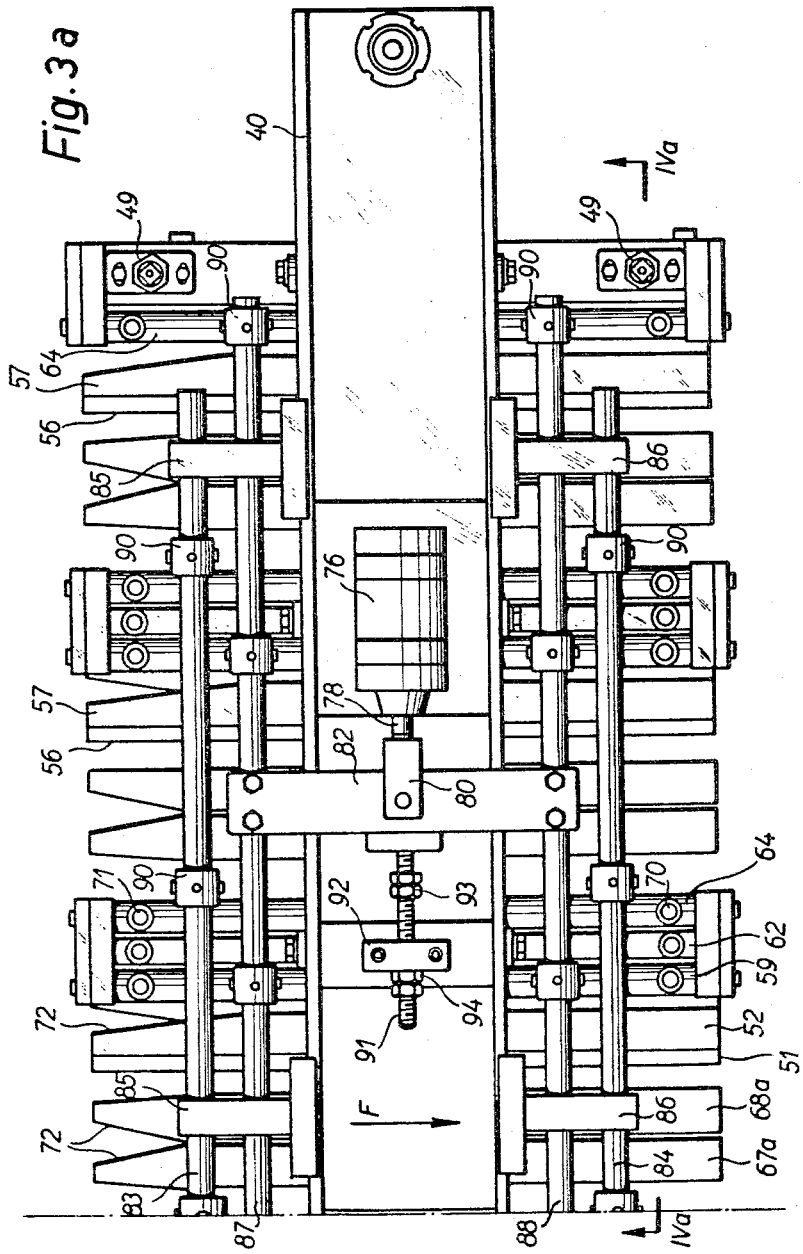

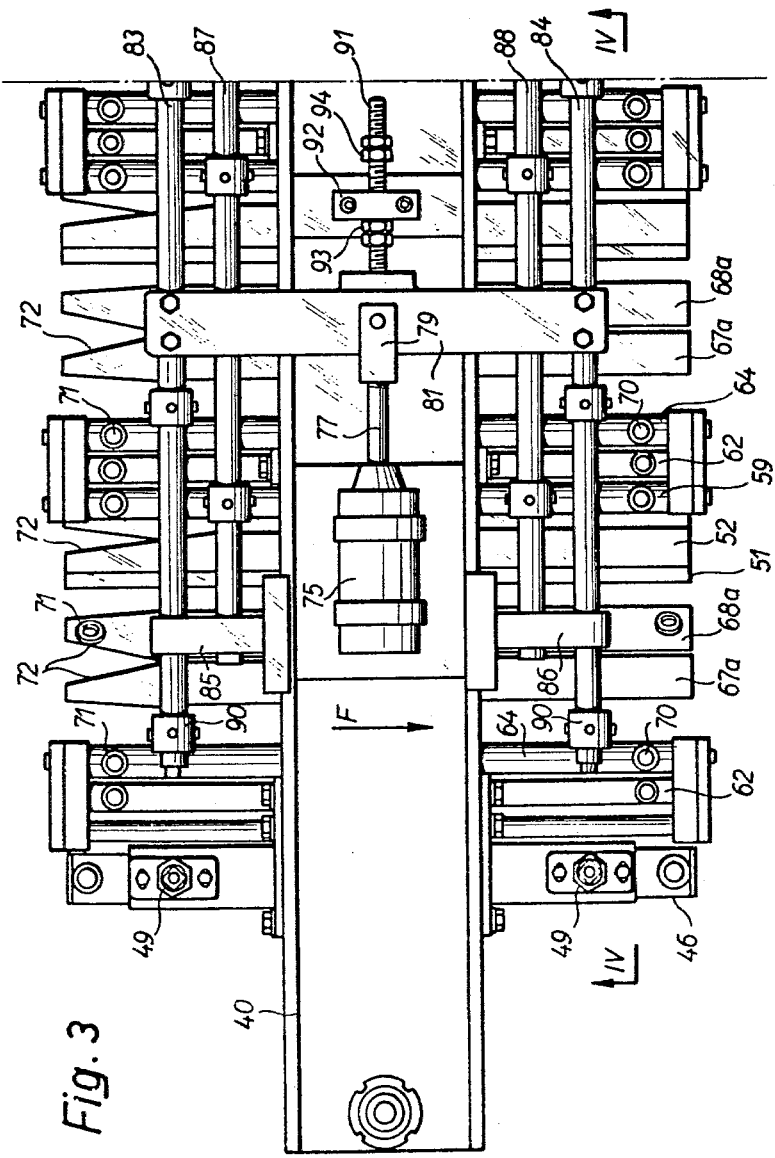

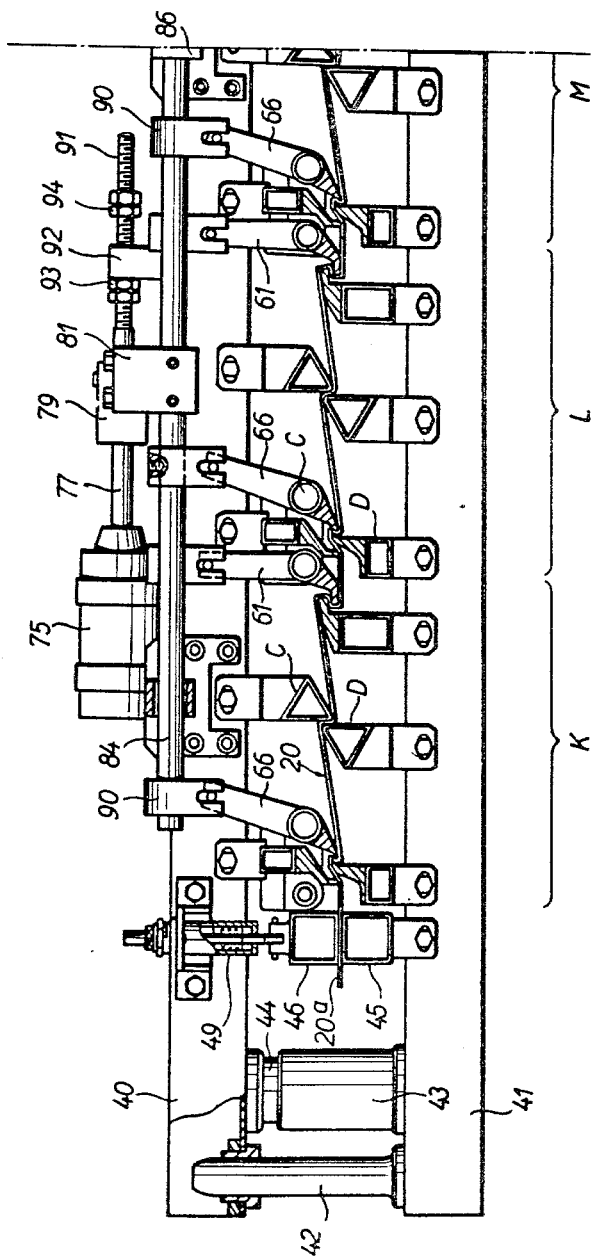

3,169,274
CONTINUOUS MACHINE FOR CORRUGATING THERMOPLASTIC SHEETS
Roberto Colombo, Turin, Italy, assignor to Lavorazione Materie Plastiche-L.M.P. S.p.A., Turin, Italy
Filed Mar. 5, 1963, Ser. No. 263,019
Claims priority, application Italy, Mar. 10, 1962, 5,014/62
4 Claims. (Cl. 18—19)

This invention relates to a continuous machine for corrugating thermoplastic sheets, more particularly, though not exclusively, polyvinyl chloride sheets, of the type comprising a preliminary hot drawing section for longitudinally drawing of the sheet, followed by a corrugating section comprising two series of hollow, internally cooled dies between which the heat-softened sheet is continuously pulled in the said longitudinal direction in sliding contact with the dies, the supply speed to the corrugating section and the take-off feed being so correlated that the sheet reaches the dies under no tension or, better said, in a longitudinal relaxed condition.

A machine of this type is disclosed by U.S. Patent No. 3,024,496 to applicants. Such machines were at first employed for manufacturing corrugated thermoplastic webs of any length, more particularly as a roof covering instead of conventional corrugated sheet metal or fluted asbestos-cement slabs. The advantage of corrugated thermoplastic sheets resided more particularly in their translucent nature and availability in a wide variety of colors, whereby the inside of sheds or other enclosures covered by such sheets could be illuminated by diffused light, conveniently filtered or colored in accordance with requirements.

In the meantime a large number of further uses for corrugated thermoplastic slabs or sheets were found. However, relatively complex shapes were required, such as shapes including undercut portions, which met with considerable difficulties in manufacture.

As disclosed by the prior patent cross corrugation of a thermoplastic sheet entails a transverse drawing of the sheet as it is pulled between the dies, while the initial width of the flat sheet entering the corrugating section is maintained. A transverse drawing, while maintaining the initial width, is made possible by a preliminary not longitudinal drawing and subsequent relaxing of the sheet. However, this was found insufficient where the desired shaping includes a number of undercuts. In this case, first of all, feed of the sheet entails a serious risk of breakage (tearing) and the sheet runs with difficulty into the labyrnth formed by the dies. Moreover, because the undercut portions considerably increase the developed sheet width, the extent of transverse drawing required to obtain the desired final shape is increased. Now, a considerable extent of transverse drawing obviously entails a serious risk of tearing.

The situation becomes still more intricate where the desired shape is angled rather than rounded, both on account of the difficulty for the sheet to run into an angled labyrinth and because with present corrugating units the dies edges, though slightly beveled, incise the sheet longitudinally. For instance, with sheets of about 1 to 1.5 mm. thickness, the edge thickness hardly reaches 0.4 to 0.5 mm.

The invention provides in a machine of the type referred to above, a novel corrugating unit avoiding the above drawbacks. The structure of the corrugating unit, which shall be defined and particularly described hereafter, is based on the principle that the labyrinth between the dies, or desired sheet shape, should as far as possible of course be defined solely, by the longitudinal die edges, instead of by the surfaces of the latter. In other words, the contact of the softened thermoplastic sheet with the dies should as far as possible take place along the edges only and never over the die surfaces. The latter should at the utmost "radiate cold" towards the sheet without removing heat by direct contact.

In this manner the sheet fed between the dies is transversely stretched between the edges of the latter, so that its portions contacting the edges cool and almost instantaneously set, while the sheet regions bridging across between edges are in a condition to be transversely drawn before cooling to a set condition.

Of course this invention provides a manner of carrying out the above principle which takes care of the previously mentioned difficulties of running in the sheet between the dies and maintaining its initial width unaltered, both initially and throughout the period of the working cycle.

All the features and further advantages of the corrugating unit according to this invention will be understood from the appended description referring to the accompanying drawings, wherein:

FIGURE 1 is a vertical section of a structure incorporating corrugated thermoplastic strips;

FIGURE 2 is a general diagram of the corrugating machine according to this invention;

Figure 4A:
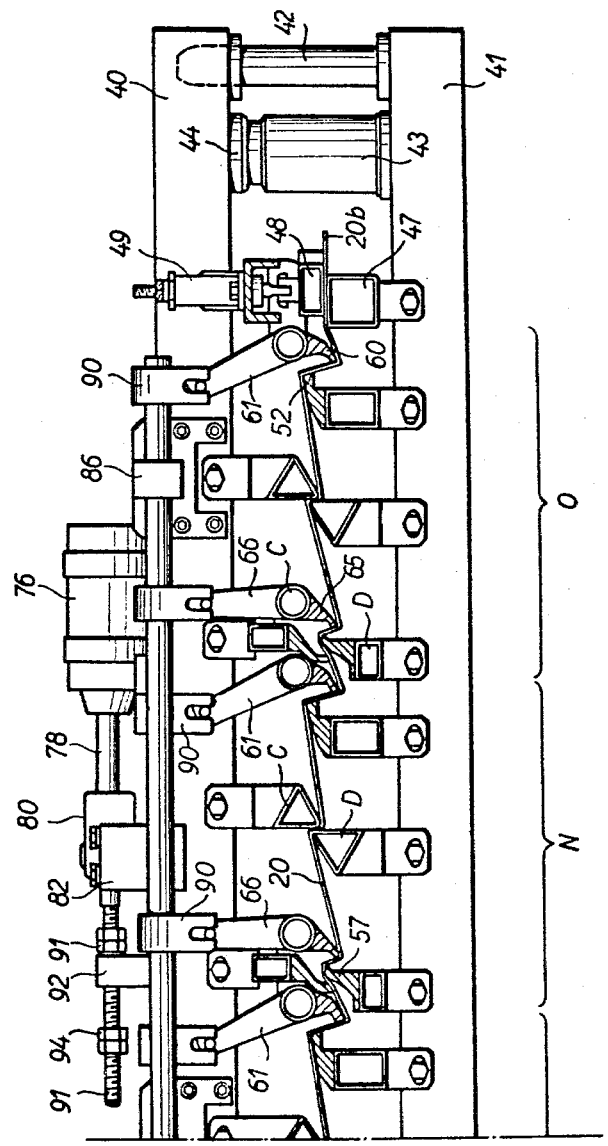
Figure 5:
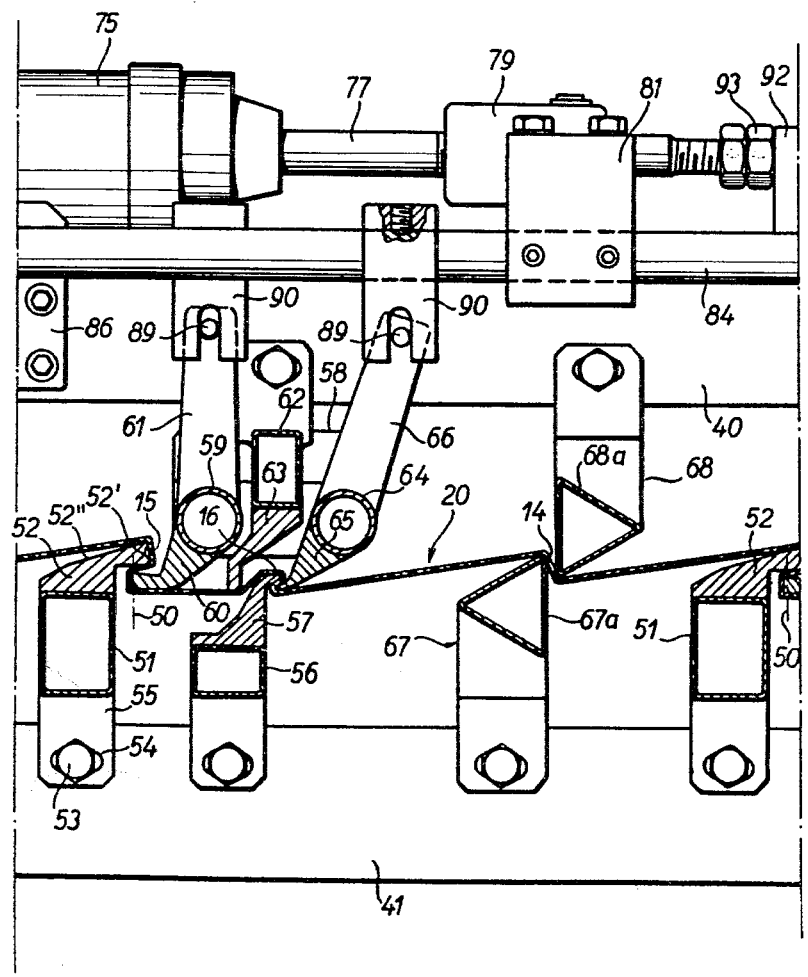

FGIURES 3 and 3a diagrammatically show in plan view a corrugating unit employed in the machine according to FIGURE 2 for manufacturing thermoplastic strips as shown in FIGURE 1;

FIGURE 4 is a cross-sectional view of FIGURE 3 on line IV—IV, showing the shaping dies in their operative position;

FIGURE 4a is a cross-sectional view of FIGURE 3a on line IVa—IVa showing the shaping dies at an intermediate position during the starting step;

FIGURE 5 is a cross-sectional detail view of the structure shown in FIGURE 4.

Referring first to FIGURE 1 the structure as shown is a wall portion 10 of a cottage or the like, the outer surface of which is covered with strips 11, 11a, 11b of a thermoplastic material, such as polyvinyl chloride, extending horizontally, that is, perpendicularly to the plane of the drawing, and each of a width A. In cross-sectional view the body of each strip comprises two slopes 12, 13 interconnected by a step 14. The bottom edge 15 of each strip is of cross-sectional channel shape to form a step simliar to the step 14. The strip profile forms between its flat top edge 17 and slope 12 a loop 16 engaged by the channel 15 in the next strip.

The covering is laid starting from the wall bottom. For instance, after nailing the top edge 17b of the strip 11b to the wall 10 by means of nails 18, the next strip 11 is fitted to the wall by fastening it by its channel 15 to the loop 16b and nailing its top edge 17 to the wall 10. The channel 15a in the strip 11a is then fastened to the loop 16 on the underlying strip 11, and so on. The loops 16 and channels 15 form water-tight seals. As an average, the width A of the strips amounts to about 25 cm. It will be advantageous to supply such strips to the consumer in any desired length.

One of the objects of this invention is to manufacture such strips in "parallel," by corrugating a web for instance 170 cm. wide to form six co-extensive strips, thereupon cutting the sheet longitudinally to sever the individual strips.

The machine is diagrammatically shown in FIGURE 2. Such machines are, but for certain details which shall be described hereafter, known per se; for this reason their operation only shall be described.

An even web 20 of thermoplastic material is unrolled from a roll 21 by means of a pair of supply rollers 22 driven by a motor 23 through a transmission 24. Motion is derived from the transmission 24 for a pair of drawing rollers 25 which are driven at a circumferential speed higher by 1 to 3% than the speed of the supply rollers 22, so that the sheet 20 is elongated at its region between the two roller pairs, the sheet being simultaneously heated by infra red radiators 26 to its softening temperature.

The softened and longitudinally drawn sheet 20 is continuously pulled through a corrugating unit 27 by means of a take-off device 28, such as a pulley and endless belt unit. In order to avoid undue cooling of the sheet, a further infrared radiator 29 is preferably provided at the inlet to the corrugating unit 27.

The take-off device 28 is driven by the transmission 24 at a speed which substantially equals the speed of the supply rollers 22, so that the sheet enters the corrugating unit under no tension or relaxed conditions in a longitudinal direction. Corrugating is effected by means of water-cooled shaping dies, so that the corrugated sheet has substantially set when issuing from the unit 27. Past the take-off device 28 a set of disc-shaped circular saws 30 are keyed to a common shaft and sever the corrugated sheet to a number of corrugated ribbons. A transverse cutting device, diagrammatically shown on the drawing in the shape of a blade 31 and counter-blade 32, shears the group of ribbons to corrugated strips 11 of a desired length.

Referring to FIGURES 3 to 5, in which the thermoplastic sheet is still denoted by 20, the corrugating unit comprises a pair of girders 40, 41, the lower girder 41 being stationary and carrying at its opposite ends vertical columns 42 in which the upper girder 40 is slidably guided in a vertical direction. Vertical movement of the upper girder 40 to a desired spacing from the lower girder 41 is effected by any suitable means; in the specific case, a pair of hydraulic jacks adjacent the columns 42 are employed, the cylinders 43 of which are fast with the lower girder, their pistons 44 being fast with the upper girder.

The two girders each carry a set series or series of shaping dies generally denoted by C and D in FIGURES 4 and 4a. The dies D associated with the lower girder are all rigidly connected with the latter, whereas the dies C associated with the upper girder are movable in part with respect to the latter, as will be seen more clearly hereafter.

As stated in the preamble, the contact of the sheet 20 and dies should be narrowly restricted. More particularly, the overall contact of all of the dies and sheet should in any case be smaller than the extent of transverse drawing of the sheet during corrugating. For instance, referring to the strips 11, 11a, 11b shown in FIGURE 1, of a width of 25 cm. each, the developed profile of each strip amounts to about 29.5 cm., which implies an extent of transverse drawing of about 18%. According to this invention, the overall contact of the die profiles and sheet should in this case amount to not more than 18% of the useful sheet width. This limited extent of contact necessitates means capable of maintaining the sheet constantly stretched in a transverse direction during shaping. In the embodiment shown on the drawing, such means comprises two pairs of shoes 45, 46 and 47, 48 (FIGS. 4 and 4a) in the form of metal boxes of rectangular cross-sectional shape, appreciably elongated in the direction F of feed of the sheet, FIGS. 3 and 3a. The shoes 45, 47 are rigidly connected to the lower girder 41, the shoes 46, 48 being supported by the upper girder by means of spring supports 49 for resilient pressing thereof against the lower shoes 45, 47, respectively. The spring pressure is adjustable in a known manner, in order to clamp the longitudinal edges 20a, 20b of the sheet between the shoe pairs by a pressure best suited to individual processing.

In the embodiment shown the dies as a whole are subdivided into five shaping sets: K, L, M, N, O (FIGS. 4 and 4a), which are all alike and adapted to form on the sheet five longitudinally co-extensive similarly corrugated regions which, after longitudinal severing by the circular saws 30 (FIG. 2), provides five shaped strips of the type shown in FIGURE 1. Cutting is effected along the lines denoted by 50 in FIGURE 5.

The shaping sets K–O comprise variously shaped dies, in accordance with the locally desired sheet profile. Referring to FIGURE 5 it will be seen that, in order to form the channelled edge 15 a die is provided which comprises a tubular shuttle 51 closed at both ends, provided with a hull 52 of a generally L-profile, both the shuttle and hull being made, for instance, of brass or other heat-conductive metal. The free longitudinal edge of the hull equals in thickness the width of the channel 15, the edge region being of a generally dovetail profile including a groove 52′ along its end surface, whereby the contact area of the hull with the softened thermoplastic sheet 20 is actually limited to the edges only of the channel 15, the remaining hull surfaces, such as the surface 52″ being removed from the sheet and serving as "radiators for cold." The shuttle 51 is rigidly secured to the lower girder 41 by means of bolts 53 extending through eyelets 54 in a support 55 for the shuttle, whereby the die can be accurately positioned longitudinally of the girder 41. A similar attachment is employed in connection with all the dies rigidly connected with their associated girders, in order to ensure accurate positioning for cooperation of the upper and lower dies, as will be seen in FIGURE 5.

In order to form the loop 16 each shaping unit includes a further die likewise comprising a shuttle 56 and a hull 57, the latter being of a generally L-shaped profile. The free horizontal flange of the L-profile entirely fills the hollow in the loop 16, which results, as distinct from channel 15, in a relatively restricted contact area.

The two just described dies have cooperating therewith three dies carried by the upper girder 40 through a common supporting block 58. A first die comprises a shuttle 59 of circular tubular cross-sectional shape, rotatably mounted about its axis in block 58 and having a hull 60 of an L-shaped profile, the free bottom flange of which extends in the operative position shown in FIGURE 5 beneath the free top flange of the hull 52, so that the two flanges are interlocked or mutually hooked through the interposition of the thermoplastic sheet; such interlocking is quite loose so that the sheet extends through the labyrinth between the two flanges without being crushed. The profile of the free flange of the hull 60 is likewise of dovetail shape, its flanks being removed from the path of the sheet 20 in order to limit the contact with the sheet to the strictly necessary extent to deflect the sheet beneath the hull 52 cooperating with the hull 60. The shuttle 59 is angularly controlled by means of a pair of upwardly extending lever arms, one only of which denoted by 61, is visible in FIGURE 5, the other arm being situated behind the girder 40.

A further die carried by the support 58 comprises a stationary shuttle 62 having a hull 63 reaching into the clearance between the hulls 57 and 60, so as to loop the sheet 20 about the hull 57 and deflect it downwardly to remove it from the bottom surface of the hull 60.

The third die carried by the support 58 comprises a shuttle 64 circular in cross-section swingably mounted about its axis in a support 58, having a hull 65 similar in profile to the hull 60 of the previous swingable shuttle 59. In the operative position the free edge zone of the hull 65 is loosely fastened, as mentioned above, to the hull 57 on the stationary lower shuttle 56 to form a loop 16 about the free edge of the lower hull 57. The shuttle 64 is likewise angularly controlled by means of a pair of arms, only one of which, 66, is visible in FIGURE 5.

Finally, the step 14 matching the desired sheet profile is formed by means of a pair of dies 67, 68 rigidly carried by their associated girders, each die comprising only a shuttle portion 67a, 68a, respectively. The step 14 has no undercut, which makes hull portions superfluous. The transverse profile of the shuttles 67a, 68a is advantageously triangular, orientated to cause the sheet to be corrugated by one longitudinal edge only of each of the two shuttles; the bottom surface of the shuttles 68a and the top surface of the shuttle 67a therefore clear from the path of the sheet 20 and act as radiators of cold.

As will be seen in FIGURES 3 and 3a, all dies extend parallel to one another in the direction F of feed of the sheet. The die length depends upon the desired processing. For instance, with shaped strips of the type shown in FIGURE 1, the length is about 50 to 60 cm. The opposite ends of each shuttle are provided with tubular fittings denoted by 70 and 71 in FIGURES 3 and 3a for the inlet and outlet of cooling water; the feed hoses therefor are not shown for the sake of clearness of the drawing. The inlet section of each hull 52, 60, 63, 57 and 65 is bevelled as indicated at 72 in FIGURES 3 and 3a, for running in of the sheet into the labyrinth defined by the dies.

The swingable dies are controlled by means of two pressure fluid jacks 75, 76, the cylinders of which are rigidly attached to the upper girder 40. The piston rods 77, 78 of the two jacks each end by a fork 79, 80, respectively, the two forks being each pivoted to the center of a yoke 81, 82, respectively. The axes of the two jacks extend parallel with the girder 40, the two yokes extending transversely thereof. The opposite ends of the yoke 81 are bolted to two bars 83, 84, respectively, extending parallel with the two opposite sides of the girder 40 and axially guided in cylindrical bearings arranged in brackets 85, 86 secured to opposite sides of the girder 40. Similarly, the opposite ends of the yoke 82 are bolted to two bars 87, 88, respectively, arranged besides the bars 83, 84, and axially guided in further plain bearings arranged in the brackets 85, 86.

The pair of bars 83, 84 control the lever arms 66 for the swingable shuttles 64, the bar pair 87, 88 controlling the lever arms 61 for the swingable shuttles 59. For this purpose the free end of each of said arms is provided with a pin 89, FIGURE 5, engaged between the branches of a fork 90 secured to its control bar.

Moreover, a screw-threaded rod 91 extends from the middle of each yoke 81, 82 parallel with the girder 40 and is axially slidable in a guide bearing arranged in a bridge member 92 rigidly secured to the girder. The screw-threaded rods 91 have screwed thereon nuts 93, 94 acting as limiting stops. By suitably positioning the nuts on their rods, the limit positions of the swingable dies controlled by the two fluid pressure jacks 75, 76 are accurately adjusted. The operative position of the swingable dies has been previously described; their inoperative position is visible in FIGURE 4a which shows that the hulls 60, 65 are spaced from the hulls 52, 57 by an extent such that the upper girder 40 can be lifted from the lower girder 41 by supplying hydraulic fluid to the jacks 43.

In operation the girder 40 should be assumed to be initially raised from the position shown in FIG. 4a to clear a fully free passage between the upper and lower dies. The machine shown in FIG. 2 is then operated, whereby the softened flat sheet 20 travels through the corrugating unit 27 and is advanced by the device 28 without undergoing any deformation by the dies. At this stage, the hydraulic fluid is slowly discharged from the lifting jacks 43, whereby the upper girder sinks to the position shown in FIGURE 4a. During this downward movement the pressure shoes 46, 48, which are spring loaded, first abut the sheet 20 and press the sheet edges against the stationary shoes 45, 47, whereupon the upper dies come into contact with the sheet which is deformed to its intermediate profile shown in FIG. 4a, with consequent transverse drawing of its regions freely extending between the individual dies. Since the contact area of the sheet and dies is narrowly restricted, such regions are of considerable transverse width and are drawn without any difficulty.

At this stage the jacks 75, 76 are slowly operated to effect angular displacements of the swingable dies, as a result of which the hulls 60, 65 are hooked beneath the hulls 52, 57, as previously described. The sheet 20 is thereby further deformed which results in further transverse drawing thereof. Since the dies are cooled by water circulation through the shuttles, the areas of the sheet in contact with the dies set almost instantaneously and are no longer affected by drawing and by the action of the die edges, clearing simultaneously wide unsupported transverse regions which are easily drawn and set with a considerable time lag behind the contact areas inasmuch as they are merely irradiated by the cold emanating from the dies. If desired, air cooling means 99 can be provided at the outlet of the corrugating unit 27, whereby the dies can be made of shorter length and the frictional resistances opposing feed of the sheet through the shaping unit is reduced.

It will be understood that the ultimate shape of the product is obtained only starting from the moment at which the hulls interlock; the whole "leading end" of the sheet is re-ground in order to recover the material.

It will be understood that the invention is not limited to the construction described with reference to the drawings, many other embodiments being possible in accordance with the desired sheet shapes.

What I claim is:

1. In a machine for continuously corrugating a web of a synthetic thermoplastic material, the machine being of the type including a preliminary hot-drawing section for longitudinally drawing the web including a pair of drawing rolls; a corrugating section fed by said drawing rolls and including two transverse series of hollow, internally cooled shaping dies arranged to act on the opposite faces of the web to transversely draw and corrugate the latter therebetween, one of said series of dies being displaceable towards and away of the other series of dies; take-off means for pulling the web at a predetermined speed through the corrugating section in sliding contact with the dies in the two series; and means correlating the pull speed of said take-off means and the effective speed of the drawing rolls; the improvements in said corrugating section for producing corrugated profile undercuts comprising; at least one undercut-shaping die in one of said series having associated therewith a complementary undercut-shaping die in the other series; means for mutually displacing the undercut-shaping dies relative to one another between a non-interlocked condition, in which the said one series of dies are freely displaceable and away from each other series, and a mutually interlocked condition in which the undercut-shaping die of one series is hooked behind a complementary die in the other series to determine the desired undercut; all of the shaping dies in the two series being arranged to establish with the web an overall transverse contact dimension smaller than the amount of the transverse drawing in the corrugating section; and means adjacent the opposite ends of the series of dies arranged to hold the web transversely during operation of the two series of dies.

2. In the machine claimed in claim 1, including a plurality of undercut-shaping dies each of said undercut-shaping dies comprising a closed-end tubular metal body and a metal hull section extending from the body towards its associated undercut-shaping die.

3. Machine as claimed in claim 2, wherein said body is supported swingable around its own axis between a condition in which its hull section interlocks with the hull section in the associated undercut-shaping die and a condition in which the first-named hull section does not interlock with the second-named hull section.

4. Machine as claimed in claim 2, wherein the hull section on at least one of said undercut-shaping dies is formed with a longitudinally grooved free edge.

References Cited by the Examiner
UNITED STATES PATENTS

| | | | |
|---|---|---|---|
| 1,122,092 | 12/14 | Fedders | 153—76 |
| 1,297,304 | 3/19 | Ford. | |
| 1,813,520 | 7/31 | White | 153—76 |
| 2,876,824 | 3/59 | West et al. | 18—19 XR |

WILLIAM J. STEPHENSON, *Primary Examiner.*